(12) United States Patent
Hua et al.

(10) Patent No.: US 12,399,618 B1
(45) Date of Patent: Aug. 26, 2025

(54) LEVERAGING RECURRENT PATTERNS OF RAID MEMBERS DISTRIBUTION FOR EFFICIENT ARRAY GROWTH

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/655,383

(22) Filed: May 6, 2024

(51) Int. Cl.
*G06F 3/06* (2006.01)

(52) U.S. Cl.
CPC .......... *G06F 3/0604* (2013.01); *G06F 3/0644* (2013.01); *G06F 3/0689* (2013.01)

(58) Field of Classification Search
CPC ..... G06F 3/0604; G06F 3/0644; G06F 3/0689
See application file for complete search history.

(56) References Cited

U.S. PATENT DOCUMENTS

| | | | | |
|---|---|---|---|---|
| 11,327,668 B1* | 5/2022 | Hua | ....................... | G06F 3/0659 |
| 11,531,500 B1* | 12/2022 | Hua | ....................... | G06F 3/0607 |
| 2021/0382642 A1* | 12/2021 | Hua | ....................... | G06F 3/0644 |
| 2021/0389896 A1* | 12/2021 | Gao | ................... | G11B 20/1816 |
| 2022/0066878 A1* | 3/2022 | Hua | ....................... | G06F 3/0659 |
| 2023/0052811 A1* | 2/2023 | Hua | .................... | G06F 11/1088 |

* cited by examiner

*Primary Examiner* — Ryan Bertram
(74) *Attorney, Agent, or Firm* — Anderson Gorecki LLP

(57) ABSTRACT

A predictable distribution of protection group members and spares in compliance with RAID requirements is maintained as a drive cluster is scaled-up and eventually split into multiple clusters. Conditions under which addition of new disks using rotation-relocation and cell borrowing would create recurrent patterns of distribution of protection group members are recognized and the associated groups of disks are index-swapped to reduce the amount of data and parity information that needs to be relocated.

20 Claims, 15 Drawing Sheets

Storage Resource Pool 205

Production Storage Object 240

| disk\cell | 1 | 2 | 3 | 4 | 5 | 6 | 7 | 8 | 9 |
|---|---|---|---|---|---|---|---|---|---|
| 1 | 1 | 2 | 3 | 4 | 5 | 6 | 7 | 8 | 9 |
| 2 | 1 | 3 | 4 | 5 | 6 | 7 | 8 | 9 |   |
| 3 | 1 | 4 | 5 | 6 | 7 | 8 | 9 |   | 2 |
| 4 | 1 | 5 | 6 | 7 | 8 | 9 |   | 2 | 3 |
| 5 | 1 | 6 | 7 | 8 | 9 |   | 2 | 3 | 4 |
| 6 | 1 | 7 | 8 | 9 |   | 2 | 3 | 4 | 5 |
| 7 | 1 | 8 | 9 |   | 2 | 3 | 4 | 5 | 6 |
| 8 | 1 | 9 |   | 2 | 3 | 4 | 5 | 6 | 7 |
| 9 | 1 |   | 2 | 3 | 4 | 5 | 6 | 7 | 8 |
| 10 |   | 2 | 3 | 4 | 5 | 6 | 7 | 8 | 9 |

Figure 3

| disk\cell | 1 | 2 | 3 | 4 | 5 | 6 | 7 | 8 | 9 |
|---|---|---|---|---|---|---|---|---|---|
| 1 | 1 | 10 | 11 | 12 | 13 | 14 | 7 | 8 | 9 |
| 2 | 1 | 10 | 11 | 12 | 13 | 14 | 8 | 9 | |
| 3 | 1 | 10 | 11 | 12 | 13 | 14 | 9 | | 2 |
| 4 | 1 | 10 | 11 | 12 | 13 | 14 | | 2 | 3 |
| 5 | 1 | 10 | 11 | 12 | 13 | | 2 | 3 | 4 |
| 6 | 1 | 10 | 11 | 12 | | 14 | 3 | 4 | 5 |
| 7 | 1 | 10 | 11 | | 13 | 14 | 4 | 5 | 6 |
| 8 | 1 | 10 | | 12 | 13 | 14 | 5 | 6 | 7 |
| 9 | 1 | | 11 | 12 | 13 | 14 | 6 | 7 | 8 |
| 10 | | 2 | 3 | 4 | 5 | 6 | 7 | 8 | 9 |
| 11 | 2 | 3 | 4 | 5 | 6 | 7 | 8 | 9 | 10 |
| 12 | 3 | 4 | 5 | 6 | 7 | 8 | 9 | 11 | 2 |
| 13 | 4 | 5 | 6 | 7 | 8 | 9 | 12 | 2 | 3 |
| 14 | 5 | 6 | 7 | 8 | 9 | 13 | 2 | 3 | 4 |
| 15 | 6 | 7 | 8 | 9 | 14 | 2 | 3 | 4 | 5 |

Figure 5

| disk\cell | 1 | 2 | 3 | 4 | 5 | 6 | 7 | 8 | 9 |
|---|---|---|---|---|---|---|---|---|---|
| 1 | 1 | 10 | 11 | 12 | 13 | 14 | 15 | 16 | 17 |
| 2 | 1 | 10 | 11 | 12 | 13 | 14 | 15 | 16 |   |
| 3 | 1 | 10 | 11 | 12 | 13 | 14 | 15 |   | 17 |
| 4 | 1 | 10 | 11 | 12 | 13 | 14 |   | 16 | 17 |
| 5 | 1 | 10 | 11 | 12 | 13 |   | 15 | 16 | 17 |
| 6 | 1 | 10 | 11 | 12 |   | 14 | 15 | 16 | 17 |
| 7 | 1 | 10 | 11 |   | 13 | 14 | 15 | 16 | 17 |
| 8 | 1 | 10 |   | 12 | 13 | 14 | 15 | 16 | 17 |
| 9 | 1 |   | 11 | 12 | 13 | 14 | 15 | 16 | 17 |
| 10 |   | 2 | 3 | 4 | 5 | 6 | 7 | 8 | 9 |
| 11 | 2 | 3 | 4 | 5 | 6 | 7 | 8 | 9 | 10 |
| 12 | 3 | 4 | 5 | 6 | 7 | 8 | 9 | 11 | 2 |
| 13 | 4 | 5 | 6 | 7 | 8 | 9 | 12 | 2 | 3 |
| 14 | 5 | 6 | 7 | 8 | 9 | 13 | 2 | 3 | 4 |
| 15 | 6 | 7 | 8 | 9 | 14 | 2 | 3 | 4 | 5 |
| 16 | 7 | 8 | 9 | 15 | 2 | 3 | 4 | 5 | 6 |
| 17 | 8 | 9 | 16 | 2 | 3 | 4 | 5 | 6 | 7 |
| 18 | 9 | 17 | 2 | 3 | 4 | 5 | 6 | 7 | 8 |

Figure 7

| disk\cell | 1 | 2 | 3 | 4 | 5 | 6 | 7 | 8 | 9 |
|---|---|---|---|---|---|---|---|---|---|
| 1 | 1 | 10 | 11 | 12 | 13 | 14 | 15 | 16 | 17 |
| 2 | 1 | 10 | 11 | 12 | 13 | 14 | 15 | 16 |  |
| 3 | 1 | 10 | 11 | 12 | 13 | 14 | 15 |  | 17 |
| 4 | 1 | 10 | 11 | 12 | 13 | 14 |  | 16 | 17 |
| 5 | 1 | 10 | 11 | 12 | 13 |  | 15 | 16 | 17 |
| 6 | 1 | 10 | 11 | 12 |  | 14 | 15 | 16 | 17 |
| 7 | 1 | 10 | 11 |  | 13 | 14 | 15 | 16 | 17 |
| 8 | 1 | 10 |  | 12 | 13 | 14 | 15 | 16 | 17 |
| 9 | 1 |  | 11 | 12 | 13 | 14 | 15 | 16 | 17 |
| 23 |  | 10 | 11 | 12 | 13 | 14 | 15 | 16 | 17 |

Figure 8

| disk\cell | 1 | 2 | 3 | 4 | 5 | 6 | 7 | 8 | 9 |
|---|---|---|---|---|---|---|---|---|---|
| 10 | 18 | 19 | 20 | 21 | 5 | 6 | 7 | 8 | 9 |
| 11 | 18 | 19 | 20 | 21 | 6 | 7 | 8 | 9 |  |
| 12 | 18 | 19 | 20 | 21 | 7 | 8 | 9 |  | 2 |
| 13 | 18 | 19 | 20 | 21 | 8 | 9 |  | 2 | 3 |
| 14 | 18 | 19 | 20 | 21 | 9 |  | 2 | 3 | 4 |
| 15 | 18 | 19 | 20 | 21 |  | 2 | 3 | 4 | 5 |
| 16 | 18 | 19 | 20 |  | 2 | 3 | 4 | 5 | 6 |
| 17 | 18 | 19 |  | 21 | 3 | 4 | 5 | 6 | 7 |
| 18 | 18 |  | 20 | 21 | 4 | 5 | 6 | 7 | 8 |
| 19 |  | 2 | 3 | 4 | 5 | 6 | 7 | 8 | 9 |
| 20 | 2 | 3 | 4 | 5 | 6 | 7 | 8 | 9 | 19 |
| 21 | 3 | 4 | 5 | 6 | 7 | 8 | 9 | 20 | 2 |
| 22 | 4 | 5 | 6 | 7 | 8 | 9 | 21 | 2 | 3 |

Figure 9

| disk\cell | 1 | 2 | 3 | 4 | 5 | 6 | 7 | 8 | 9 |
|---|---|---|---|---|---|---|---|---|---|
| 10 |  | 2 | 3 | 4 | 5 | 6 | 7 | 8 | 9 |
| 11 | 2 | 3 | 4 | 5 | 6 | 7 | 8 | 9 |  |
| 12 | 3 | 4 | 5 | 6 | 7 | 8 | 9 |  | 2 |
| 13 | 4 | 5 | 6 | 7 | 8 | 9 |  | 2 | 3 |

| disk\cell | 1 | 2 | 3 | 4 | 5 | 6 | 7 | 8 | 9 |
|---|---|---|---|---|---|---|---|---|---|
| 19 |  | 2 | 3 | 4 | 5 | 6 | 7 | 8 | 9 |
| 20 | 2 | 3 | 4 | 5 | 6 | 7 | 8 | 9 |  |
| 21 | 3 | 4 | 5 | 6 | 7 | 8 | 9 |  | 2 |
| 22 | 4 | 5 | 6 | 7 | 8 | 9 |  | 2 | 3 |

Figure 10

| disk\cell | 1 | 2 | 3 | 4 | 5 | 6 | 7 | 8 | 9 |
|---|---|---|---|---|---|---|---|---|---|
| 19 | 18 | 19 | 20 | 21 | 5 | 6 | 7 | 8 | 9 |
| 20 | 18 | 19 | 20 | 21 | 6 | 7 | 8 | 9 |  |
| 21 | 18 | 19 | 20 | 21 | 7 | 8 | 9 |  | 2 |
| 22 | 18 | 19 | 20 | 21 | 8 | 9 |  | 2 | 3 |
| 14 | 18 | 19 | 20 | 21 | 9 |  | 2 | 3 | 4 |
| 15 | 18 | 19 | 20 | 21 |  | 2 | 3 | 4 | 5 |
| 16 | 18 | 19 | 20 |  | 2 | 3 | 4 | 5 | 6 |
| 17 | 18 | 19 |  | 21 | 3 | 4 | 5 | 6 | 7 |
| 18 | 18 |  | 20 | 21 | 4 | 5 | 6 | 7 | 8 |
| 10 |  | 2 | 3 | 4 | 5 | 6 | 7 | 8 | 9 |
| 11 | 2 | 3 | 4 | 5 | 6 | 7 | 8 | 9 | 19 |
| 12 | 3 | 4 | 5 | 6 | 7 | 8 | 9 | 20 | 2 |
| 13 | 4 | 5 | 6 | 7 | 8 | 9 | 21 | 2 | 3 |

Figure 11

| disk\cell | 1 | 2 | 3 | 4 | 5 | 6 | 7 | 8 | 9 |
|---|---|---|---|---|---|---|---|---|---|
| 1 | | | | | | | 7 | 8 | 9 |
| 2 | | | | | | | 8 | 9 | |
| 3 | | | | | | | 9 | | 2 |
| 4 | | | | | | | | 2 | 3 |
| 5 | | | | | | | 2 | 3 | 4 |
| 6 | | | | | | | 3 | 4 | 5 |
| 7 | | | | | | | 4 | 5 | 6 |
| 8 | | | | | | | 5 | 6 | 7 |
| 9 | | | | | | | 6 | 7 | 8 |
| 10 | | 2 | 3 | 4 | 5 | 6 | 7 | 8 | 9 |
| 11 | 2 | 3 | 4 | 5 | 6 | 7 | 8 | 9 | |
| 12 | 3 | 4 | 5 | 6 | 7 | 8 | 9 | | 2 |
| 13 | 4 | 5 | 6 | 7 | 8 | 9 | | 2 | 3 |
| 14 | 5 | 6 | 7 | 8 | 9 | | 2 | 3 | 4 |
| 15 | 6 | 7 | 8 | 9 | | 2 | 3 | 4 | 5 |

```
for (x=1; x<=R; x++ )
for (y=W-P+1; y<=W; y++ )
    Disk[2*W+x].Cell[y] = Disk[x].Cell[y]

for (x=R+1; x<=W; x++ )
for (y=W-P+1; y<=W; y++ )
    Disk[W+y].Cell[x] = Disk[x].Cell[y]

for (x=W+R+1; x<=2*W-P; x++ )
for (y=1; y<=R; y++ )
    Disk[2*W+y].Cell[x-W] = Disk[x].Cell[y]
```

Figure 12

| disk\cell | 1 | 2 | 3 | 4 | 5 | 6 | 7 | 8 | 9 | disk # |
|---|---|---|---|---|---|---|---|---|---|---|
| 19 |   |   |   |   | 5 | 6 | 7 | 8 | 9 | 2W+1 |
| 20 |   |   |   |   | 6 | 7 | 8 | 9 |   | 2W+2 |
| 21 |   |   |   |   | 7 | 8 | 9 |   | 2 | * |
| 22 |   |   |   |   | 8 | 9 |   | 2 | 3 | 2W+R |
| 14 |   |   |   |   | 9 |   | 2 | 3 | 4 | W+R+1 |
| 15 |   |   |   |   |   | 2 | 3 | 4 | 5 | 2W-P |
| 16 |   |   |   |   | 2 | 3 | 4 | 5 | 6 | 2W-P+1 |
| 17 |   |   |   |   | 3 | 4 | 5 | 6 | 7 | * |
| 18 |   |   |   |   | 4 | 5 | 6 | 7 | 8 | 2W |
| 10 |   | 2 | 3 | 4 | 5 | 6 | 7 | 8 | 9 | W+1 |
| 11 | 2 | 3 | 4 | 5 | 6 | 7 | 8 | 9 |   | W+2 |
| 12 | 3 | 4 | 5 | 6 | 7 | 8 | 9 |   | 2 | * |
| 13 | 4 | 5 | 6 | 7 | 8 | 9 |   | 2 | 3 | W+R |

```
for (x=1; x<=R; x++ )
for (y=W-P+1; y<=W; y++ )
    Disk[2*W+x].Cell[y] = Disk[x].Cell[y]

for (x=R+1; x<=W; x++ )
for (y=W-P+1; y<=W; y++ )
    Disk[W+y].Cell[x] = Disk[x].Cell[y]

for (x=W+R+1; x<=2*W-P; x++ )
for (y=1; y<=R; y++ )
    Disk[2*W+y].Cell[x-W] = Disk[x].Cell[y]
```

Figure 13

| disk\cell | 1 | 2 | 3 | 4 | 5 | 6 | 7 | 8 | 9 |
|---|---|---|---|---|---|---|---|---|---|
| W+2 | 10 | 11 | 12 | 13 | 14 | 15 | 16 | 17 | 18 |
| W+3 | 10 | 11 | 12 | 13 | 14 | 15 | 16 | 17 | |
| * | 10 | 11 | 12 | 13 | 14 | 15 | 16 | | 18 |
| * | 10 | 11 | 12 | 13 | 14 | 15 | | 17 | 18 |
| * | 10 | 11 | 12 | 13 | 14 | | 16 | 17 | 18 |
| 2W-2 | 10 | 11 | 12 | 13 | | 15 | 16 | 17 | 18 |
| 2W-1 | 10 | 11 | 12 | | 14 | 15 | 16 | 17 | 18 |
| 2W | 10 | 11 | | 13 | 14 | 15 | 16 | 17 | 18 |
| 2W+1 | 10 | | 12 | 13 | 14 | 15 | 16 | 17 | 18 |
| W+1 | | 2 | 3 | 4 | 5 | 6 | 7 | 8 | 9 |
| 2 | 1 | 3 | 4 | 5 | 6 | 7 | 8 | 9 | 11 |
| 3 | 1 | 4 | 5 | 6 | 7 | 8 | 9 | 12 | 2 |
| 4 | 1 | 5 | 6 | 7 | 8 | 9 | 13 | 2 | 3 |
| * | 1 | 6 | 7 | 8 | 9 | 14 | 2 | 3 | 4 |
| * | 1 | 7 | 8 | 9 | 15 | 2 | 3 | 4 | 5 |
| W-2 | 1 | 8 | 9 | 16 | 2 | 3 | 4 | 5 | 6 |
| W-1 | 1 | 9 | 17 | 2 | 3 | 4 | 5 | 6 | 7 |
| W | 1 | 18 | 2 | 3 | 4 | 5 | 6 | 7 | 8 |
| 1 | 1 | 2 | 3 | 4 | 5 | 6 | 7 | 8 | 9 |

Figure 14

LEVERAGING RECURRENT PATTERNS OF RAID MEMBERS DISTRIBUTION FOR EFFICIENT ARRAY GROWTH

TECHNICAL FIELD

The subject matter of this disclosure is generally related to electronic data storage.

BACKGROUND

Redundant Array of Independent Drives (RAID) protection groups help to avoid data loss in electronic data storage systems by enabling reconstruction of a failed protection group member using the remaining members of the protection group. Individual disk drives are organized into a plurality of same-size cells (also known as partitions), each of which is either used for storing a protection group member or reserved as spare capacity for rebuilding a failed protection group member. A RAID-L (D+P) protection group has D data members and P parity members that define a width W=(D+P) for RAID level L. For example, RAID-5 (4+1) is characterized by D=4, P=1, and W=5. The data members store data. The parity members store parity information such as XORs of the data values. The parity information enables reconstruction of the data in the event that a data member fails. The data members enable reconstruction of the parity information in the event that a parity member fails. Each member of a RAID protection group is maintained on a different disk drive to enable reconstruction after a member is lost due to drive failure.

SUMMARY

A method in accordance with some implementations comprises creating a drive cluster by: creating, for a protection group width W, a drive cluster of W+1 sequentially indexed drives; creating W same-size sequentially indexed cells in each of the drives; creating, in a first cell index, a protection group in sequentially indexed drives starting with a lowest indexed drive; and creating W spare cells and (W−1) additional protection groups distributed in cell-index-wise consecutive runs of a spare cell followed by sequentially ordered members of the additional protection groups; receiving N new drives; determining that adding the N new drives to the drive cluster using a rotation-relocation algorithm to relocate the first W members of a lowest unrotated cell index, other than the first cell index, to the new drives will create a recurrent member distribution pattern on a first subset of the drives of the drive cluster and a second subset of the new drives; and swapping drive indices of the drives of the first subset with the drives of the second subset.

An apparatus in accordance with some implementations comprises: a plurality of non-volatile drives; a plurality of interconnected compute nodes that manage access to the drives; and a drive manager configured to: create, for a protection group width W, a drive cluster of W+1 sequentially indexed drives; create at least W same-size sequentially indexed cells in each of the drives; create, in a first cell index, a protection group in sequentially indexed drives starting with a lowest indexed drive; create W spare cells and (W−1) additional protection groups distributed in cell-index-wise consecutive runs of a spare cell followed by sequentially ordered members of the additional protection groups; responsive to receipt of N new drives, determine that adding the N new drives to the drive cluster using a rotation-relocation algorithm to relocate the first W members of a lowest unrotated cell index, other than the first cell index, to the new drives will create a recurrent member distribution pattern on a first subset of the drives of the drive cluster and a second subset of the new drives; and swap drive indices of the drives of the first subset with the drives of the second subset.

In accordance with some implementations, a computer-readable storage medium stores instructions that when executed by a computer cause the computer to perform a method for using a computer system to create and distribute spare capacity on a scalable drive subset on which protection groups are maintained, the method comprising: creating a drive cluster by: creating, for a protection group width W, a drive cluster of W+1 sequentially indexed drives; creating W same-size sequentially indexed cells in each of the drives; creating, in a first cell index, a protection group in sequentially indexed drives starting with a lowest indexed drive; and creating W spare cells and (W−1) additional protection groups distributed in cell-index-wise consecutive runs of a spare cell followed by sequentially ordered members of the additional protection groups; receiving N new drives; determining that adding the N new drives to the drive cluster using a rotation-relocation algorithm to relocate the first W members of a lowest unrotated cell index, other than the first cell index, to the new drives will create a recurrent member distribution pattern on a first subset of the drives of the drive cluster and a second subset of the new drives; and swapping drive indices of the drives of the first subset with the drives of the second subset.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 3 illustrates an initial drive cluster of (W+1) drives on which RAID (D+P) protections groups and spares are predictably distributed.

FIG. 5 illustrates rotation-redistribution of protection group members to maintain predictable distribution when five new drives are added to the initial drive cluster of FIG. 3.

FIG. 7 illustrates rotation-redistribution of protection group members to maintain predictable distribution when three new drives are added to the drive cluster of FIG. 5.

FIGS. 8 and 9 illustrate rotation-redistribution and split to maintain predictable distribution when five new drives are added to the drive cluster of FIG. 7.

FIG. 10 illustrates a recurrent distribution pattern from FIGS. 7 and 9.

FIG. 11 illustrates re-indexing of drives associated with the recurrent distribution pattern shown in FIG. 10.

FIGS. 12 and 13 illustrate protection group member redistribution for N≤W, K+N>2 W+1.

FIG. 14 illustrates avoidance of protection group member redistribution for N=W, K=W+1.

DETAILED DESCRIPTION

Figure 1:
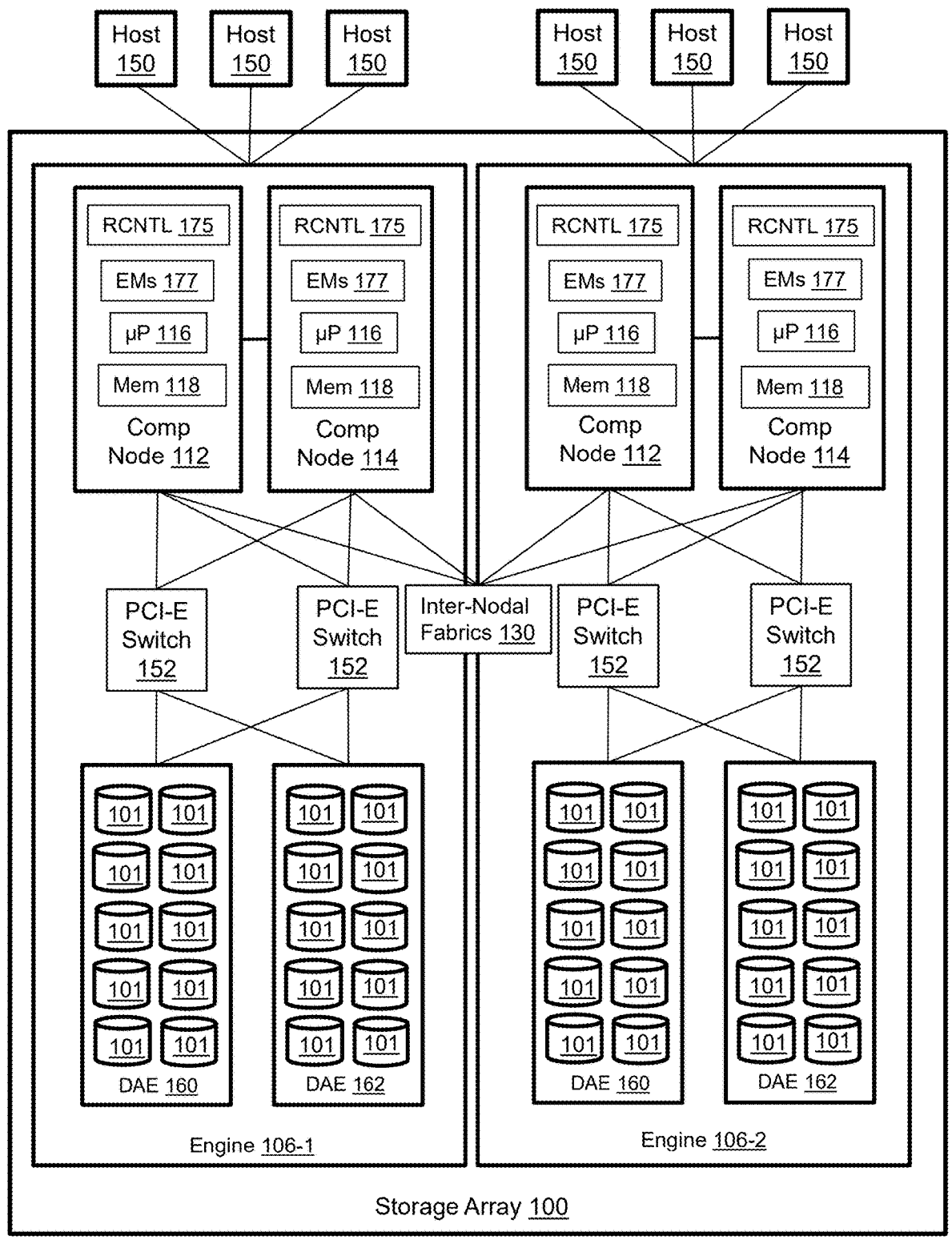
FIG. 1 illustrates a storage array with RAID controllers that are configured to reduce relocations of protection group members when scaling-up a drive cluster by re-indexing drives based on recurrent patterns of RAID member distribution.

U.S. Pat. No. 11,314,608 titled CREATING AND DISTRIBUTING SPARE CAPACITY OF A DISK ARRAY is incorporated by reference. U.S. patent application Ser. No. 18/585,131 titled GROWING AND SPLITTING RAID CLUSTERS WITH WIDE DISTRIBUTION AND ASSIGNMENT OF SPARE CAPACITY FOR FAST PARALLEL DATA RECOVERY is incorporated by reference. The incorporated references describe techniques for maintaining predictable distribution of protection group members and spares in compliance with RAID requirements as a drive cluster is scaled-up and eventually split into multiple clusters. Advantages associated with maintaining predictable distribution of protection group members and spares include facilitating recovery from disk failure and facilitating iterative drive cluster growth and split cycles. The presently disclosed invention may be predicated in part on recognition that relocation of protection group members in order to maintain a predictable distribution of protection group members and spare capacity while a drive cluster is scaled-up can be reduced by swapping the drive indices of groups of drives that exhibit recurrent patterns of distribution of protection group members.

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

FIG. 1 illustrates a storage array 100 with RAID controllers 175 that are configured to reduce relocations of protection group members while maintaining predictable distribution of protection group members and spares and scaling-up drive cluster storage capacity by re-indexing drives based on recurrent patterns of RAID member distribution. The illustrated storage array includes two engines 106-1, 106-2. However, the storage array might include any number of engines. Each engine includes disk array enclosures (DAEs) 160, 162 and a pair of peripheral component interconnect express (PCI-e) interconnected compute nodes 112, 114 (also known as storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. RAID controllers 175 may include one or more of: special purpose electronic components, logic, and computer program code loaded into memory 118 from the managed drives 101 and run on the processors 116.

Figure 2:
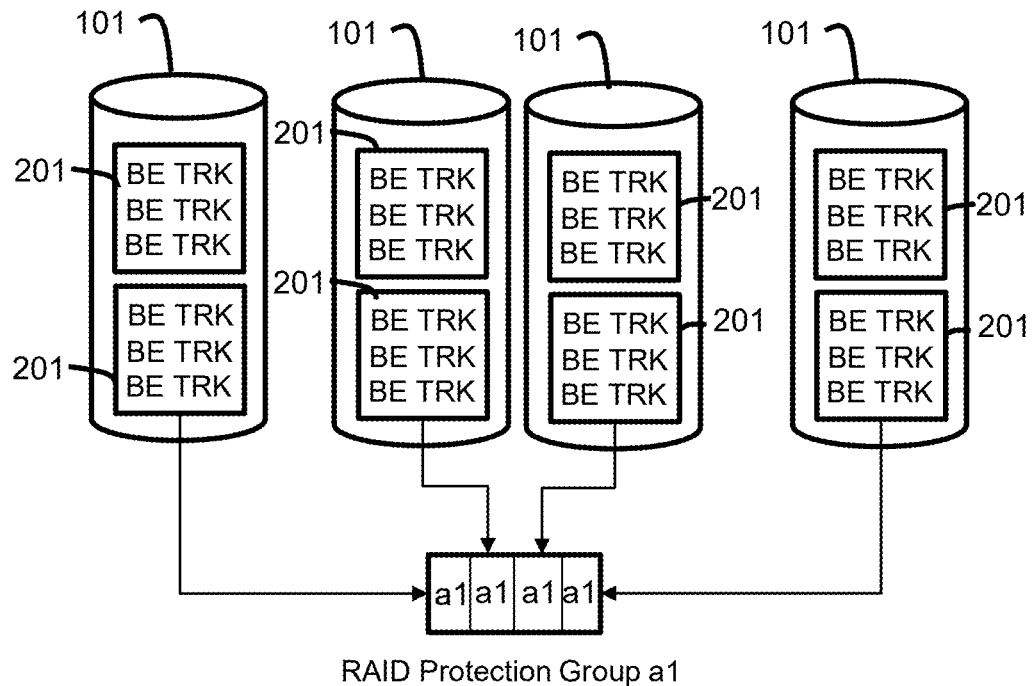
FIG. 2 illustrates layers of abstraction between the managed drives and the production storage object of the storage array of FIG. 1.
Figure 2:
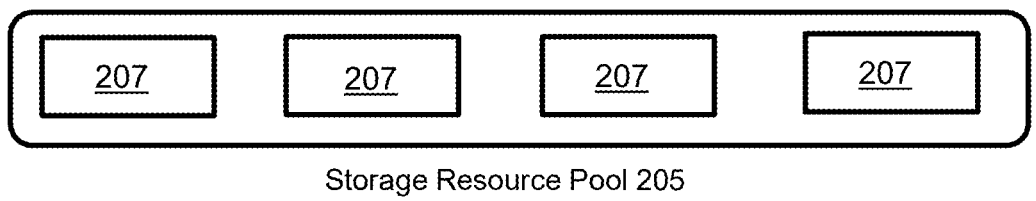
Figure 2:
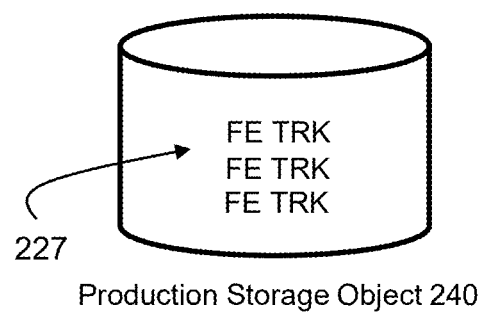

Referring to FIGS. 1 and 2, data that is created and used by instances of the host applications running on the host servers 150 is maintained on the managed drives 101. The managed drives are not discoverable by the host servers 150, so the storage array creates logical production storage objects such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata that maps between the LBAs of the production volume 240 and physical addresses on the managed drives 101 in order to process IOs from the host servers. Each production storage object is uniquely associated with a single host application. The storage array may maintain a plurality of production storage objects and simultaneously support multiple host applications.

The basic allocation unit of storage capacity that is used by the compute nodes 112, 114 to access the managed drives is a back-end track (BE TRK). The managed drives are organized into same-size units of storage capacity referred to herein as cells 201, each of which may contain multiple BE TRKs. Although individual drives can be configured as RAID group members, in the illustrated example a cell grouping containing cells 201 from different managed drives is used to create a RAID protection group a1, such as a RAID-5 (3+1) protection group, in which each member is referenced as a1. In order to be RAID-compliant, each member of a given protection group must be on a different managed drive. In the illustrated example, each cell 201 contains one member of protection group "a1" stored on a particular managed drive. Other protection groups, e.g., a2, b1, b2, c1, c2, d1, d2, and so forth, would be similarly formed. Storage resource pool 205 is a type of storage object that includes a collection of protection groups of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

FIG. 3 illustrates a minimal initial drive cluster of (W+1) managed drives on which RAID (D+P) protections groups and spare capacity are predictably distributed. The drive cluster is represented as a matrix of sequentially numbered disk index rows and cell index columns. The initial minimal drive cluster has (W+1) drives and W same-size cells. The specifically illustrated example is a RAID-5 (8+1), so each of 10 drives (indexed 1 through 10) is organized into 9 same-size cells (indexed 1 through 9).

RAID protection groups in the illustrated example are sequentially referenced with numbers 1, 2, 3, and so forth, in the cell in which the corresponding protection group member is located. The members of RAID group (1) are located in the first column, which in this example is cell index 1 of disks 1-9. Members of the other RAID groups, in sequential order (2 through 9) preceded by a spare cell, are located in the next cells in column-wise consecutive runs starting at disk 10, cell 1. This distribution pattern locates spare storage capacity equivalent to one disk drive across W spare cells, diagonally distributed within the representative matrix, with one spare cell on each of W drives. The distribution of the spare cells may be maintained as the drive cluster is scaled-up so that spare cell locations are easily found in the event of a disk failure.

Figure 4:
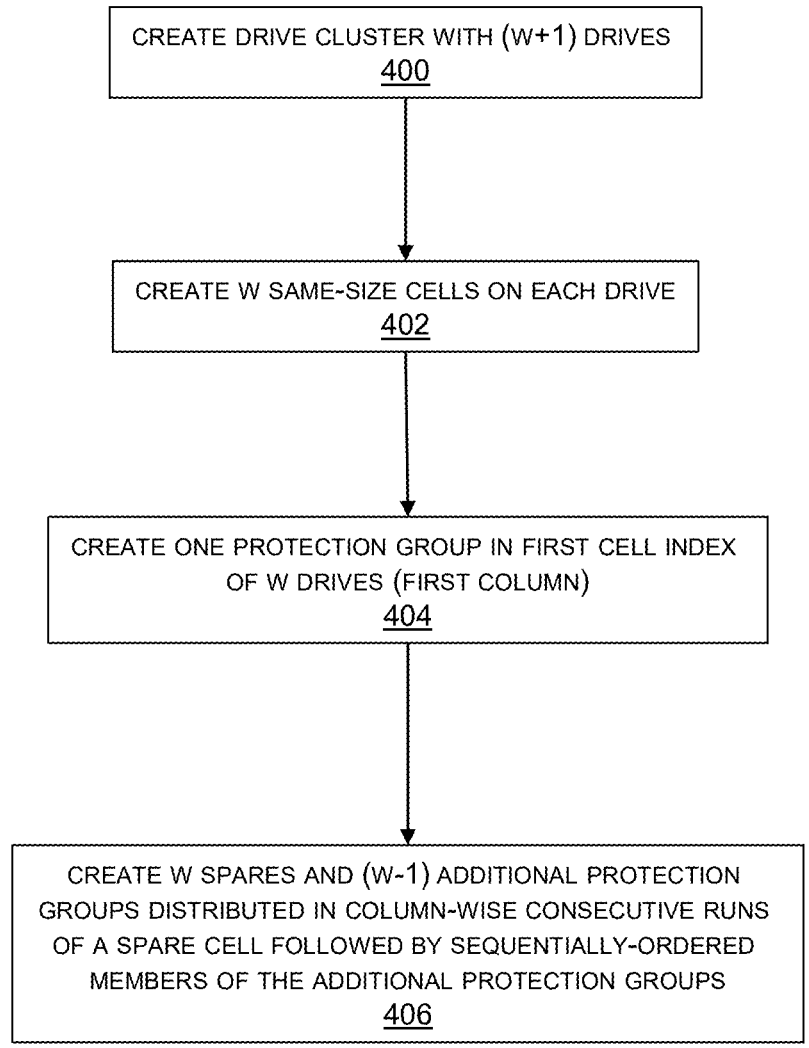
FIG. 4 illustrates a method for creating the initial drive cluster of FIG. 3.

FIG. 4 illustrates a method for creating the initial drive cluster of FIG. 3. The cluster is created using (W+1) drives as indicated in step 400. The drives are represented by a matrix in which the drives are sequentially numbered, e.g., 1 through W+1 drive index rows. In step 402, each of the drives is organized into W same-size cells. The cells are sequentially indexed, e.g., cell index columns in the representative matrix. Step 404 is creating one protection group in consecutively numbered drive index rows of the first cell index starting with the first drive. Step 406 is creating W spare cells and (W−1) additional protection groups distributed in column-wise consecutive runs. Each run may include a spare cell followed by a member of each of the additional protection groups in sequential order. The pattern is repeated until the matrix, and thus the drive cluster, is populated with protection group members and spare cells.

FIG. 5 illustrates rotation-redistribution of protection group members when five new drives (11-15) are added to the initial drive cluster of FIG. 3. RAID members are relocated to each new disk according to a rotation algorithm that creates a predictable distribution pattern in which, potentially in multiple new drive addition events, the initial drive cluster pattern is recreated on the highest-indexed drives and new protection groups are formed using vacated and borrowed cells. Multiple new drives may be added in a single event, but the rotations are conceptually performed on a per-drive basis within that event. In each single-drive rotation step, a vertical column of the W lowest-indexed previously unrotated cells, excluding the single cell index protection group initially created in the first cell index, are rotated in order to a horizontal row of W cells on the new drive. In the illustrated example, RAID members at cell indices 2-6 of disks 1-9 are relocated to new disks 11-15 according to the rotation algorithm. The drive number from which the protection group member is moved becomes the cell number to which the protection group member is moved. For example, the RAID members (2, 3, 4, 5, 6, 7, 8, 9) in cell index 2 of disks 1-8 are rotated to cells 1-8 of new disk 11. The spare cell at cell index 2, disk 9 is not relocated. The cells that are vacated by rotation-relocation are used to create new RAID group 10. Rotations of cell indices 2-6 yield vacated cells that are used to create RAID groups (10-14). The original locations of the distributed spare cells are maintained by "borrowing" one empty cell on each new disk (11-15) for each new RAID group (10-14). Conceptually, the spare cells can be viewed as being either rotated and replaced or unrotated because spare cells have no contents to relocate.

Figure 6:
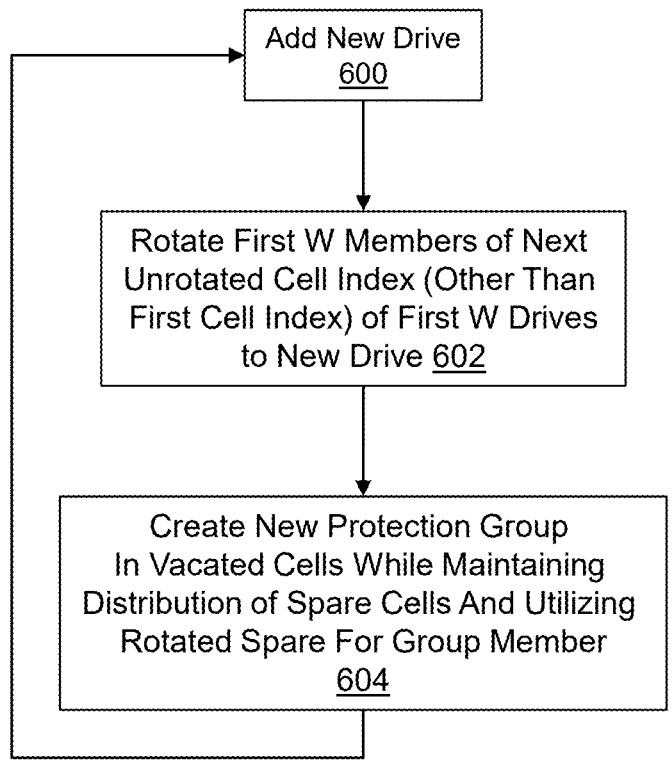
FIG. 6 illustrates a method for rotation-redistribution of protection group members to maintain predictable distribution when new drives are added to a drive cluster.

FIG. 6 illustrates a method for rotation-redistribution of protection group members when new drives are added to a drive cluster. A new drive is added in step 600. The new drive is tagged with the next sequential drive index. Step 602 is rotating the first W members of the next unrotated cell index, excluding the first cell index, to the new drive. The drive number from which the member is moved becomes the cell number to which the member is moved. Spare cells are not relocated. Step 604 is creating new protection groups in the cells that are vacated due to rotation-redistribution. The distribution of spare cells is maintained and conceptually rotated spares become empty cells that are borrowed for the new protection groups.

FIG. 7 illustrates rotation-redistribution of protection group members when three new drives (16-18) are added to the drive cluster of FIG. 5. RAID members from cell indices 7-9 are rotation-relocated to disks 16-18. Three new RAID groups (15-17) are created in the vacated cells and borrowed cells on the new disks. RAID groups (2-9) have all members located in the bottom half of the matrix. RAID groups (10-17) have almost all members located in the top half of the matrix, except those in the borrowed cells. The predictable distribution pattern and the locations of the spare cells are maintained.

FIGS. 8 and 9 illustrate rotation-redistribution and split when five new drives (19-23) are added to the drive cluster of FIG. 7. There are no remaining rotatable cells on the original W+1 drives when the number of drives is 2*W+1, which corresponds to 19 drives in the illustrated example. A split is prompted when addition of new drives results in there being at least 2*(W+1) drives in the cluster. Rotation-relocation is implemented before the split to prepare a second set of diagonally-oriented cells that will become the locations of spare cells. The highest index new disk 23 is added to the first post-split cluster shown in FIG. 8 to accommodate the protection group members vacated from the second post-split cluster shown in FIG. 9 to free cells for a second diagonally-oriented distribution of cells corresponding to the locations of spare cells. In other words, RAID members in the "borrowed" cells are relocated to new disk 23. Each post-split cluster then has a diagonal of spare cells for data recovery. RAID members in cell indices (1-4) of the second new cluster are rotation-relocated to four of the new disks (19-22). New RAID groups are formed using empty cells after the relocation operations. There will be about (W−1) members relocated per new disk (with W cells).

FIG. 10 illustrates a recurrent distribution pattern that results from the scaling steps shown in FIGS. 7 and 9. Specifically, without considering the borrowed cells, the distribution of protection groups members and spares on disks 10-13 resulting from the addition of new disks 11-15 to the initial drive cluster as shown in FIG. 5 matches the distribution of protection groups members and spares on disks 19-22 resulting from the addition of disks 19-23 as shown in FIGS. 8 and 9. The condition can be generalized as recurrence of the distribution pattern of disks (W+1) through (W+R) on new disks (2 W+1) through (2 W+R), where R is the number of disks added to the new cluster after the split, so the new cluster has (W+R) disks. Under conditions that would cause a distribution pattern to reoccur within the same drive addition event, rotation-relocation can be reduced by rearranging the drive order to recreate the distribution pattern. For example, disks 10-13 can be index-swapped with disks 19-22, respectively. Drives do not need to be physically relocated within the DAEs to be re-ordered. Rather, re-ordering of disks can be implemented by changing the indices assigned to the drives. The original drive indices are shown in the drawings for clarity of explanation.

FIG. 11 illustrates re-ordering of drives associated with the recurrent distribution pattern shown in FIG. 10. By index-swapping disks (10-13) with disks (19-22) in the new cluster, relocation of most RAID members on disks (10-13) is avoided. The cluster converges to the distribution pattern in FIGS. 8 and 9. Each new disk (16-22) receives 5 or fewer relocated RAID members (highlighted in the figure). Data movement is reduced from the 8 cells per new disk that would be expected without index-swapping the groups of disks that exhibit the recurrent distribution pattern. RAID members in the highlighted cells of indices (7-9) of disks (11-15) are relocated to new disk (23) in the other cluster. The vacated cells, together with empty cells on new disks, are used for new RAID groups (18-21) or spare capacity.

Redistribution of protection group members to maintain the predictable distribution pattern after re-ordering of drives is dependent on certain conditions associated with the number of drives (K) currently in the drive cluster when N new drives are added, and the RAID width W. Those conditions are discussed below.

FIGS. 12 and 13 illustrate protection group member redistribution for the condition N≤W and K+N>2 W+1. The drive cluster is split into two separate drive clusters shown in the figures, respectively. The first drive cluster shown in FIG. 12 retains disks 1 through W and adds disk (K+N) with RAID members from the borrowed cells. Drives 10-13 are index-swapped with drives 19-22 in the second drive cluster. Let P=2 W−K and R=K+N−2 W−1. RAID members are relocated via three submatrix operations as shown with pseudo-code and highlighting, where W=9, K=15, N=8. After relocating the RAID members, disks in the clusters are re-indexed (renumbered) from 1 to W+R (e.g., new disk 19 renumbered as 1).

FIG. 14 illustrates protection group member relocation avoidance for the condition N=W, K=W+1. Disks 1 and W+1 are index-swapped. New rows are added to the top half of the matrix. New RAID groups are created on the new disks and borrowed original spare cells. No protection group members are relocated. Disks in the cluster are renumbered from top to bottom, e.g., new disk W+2 renumbered as 1, and original disk 1 renumbered as 2 W+1.

For the condition N≤W and K+N≤2 W+1 there will not be a recurrent distribution pattern, so the rotation-relocation technique is used to scale the storage capacity while maintaining the predictable distribution of protection group members and spares. For the condition N>W, groups of (W+1) new disks are used to create new clusters with new RAID groups and no relocations of existing RAID members. One of the other conditions will then hold true for the remaining N disks, where N=N modulo (W+1), i.e. remainder of disks that cannot form a new cluster and must be added to the existing cluster.

Figure 15:
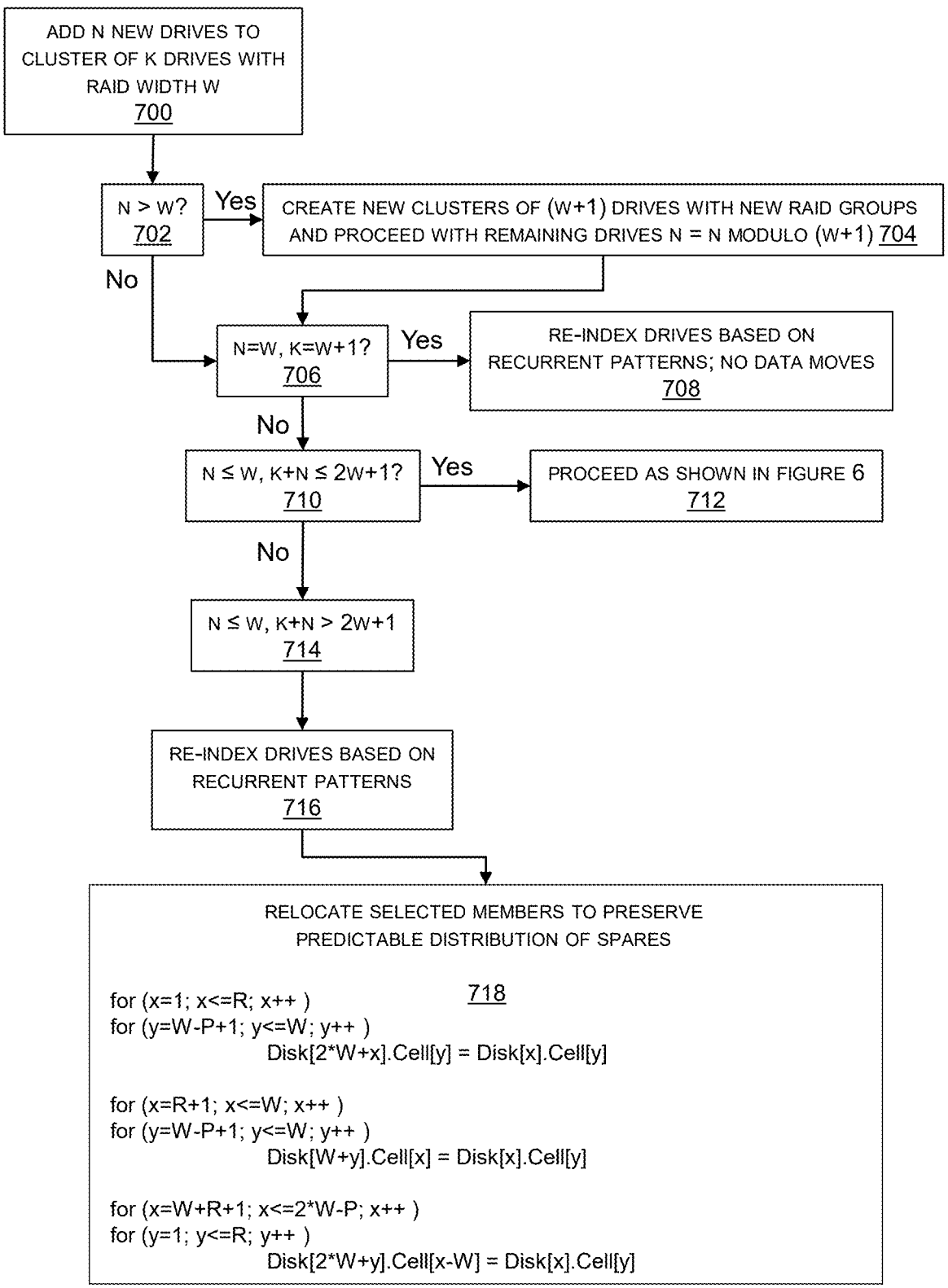
FIG. 15 illustrates a method for scaling storage capacity.

FIG. 15 illustrates a method for scaling storage capacity. N new drives are added to a cluster of K drives with RAID width W in step 700. The distribution of protection group members and spares is predictable and based on the minimal initial drive cluster of (W+1) managed drives. If N is greater than W, as determined in step 702, then there are enough new drives to create at least one new cluster. Step 704 is creating new clusters of (W+1) new drives with new protection groups. The remaining new drives define an updated value of N that is used to determine how to add those drives to the cluster of K drives. In-processing of the new drives is dependent on whether rotation-relocation of protection group members would create a recurrent distribution pattern. If so, then drive re-indexing is implemented. In the special case in which N=W and K=W+1, as determined in step 706, the drives are re-indexed based on recurrent patterns to achieve the predictable distribution of protection group members and spares without relocation of protection group members as indicated in step 708. If N≤W and K+N≤2 W+1 as determined in step 710, there are no recurrent patterns, so the rotation-relocation algorithm is used as indicated in step 712. Otherwise, the condition N≤W and K+N≥2 W+1 holds true as verified in step 714 and relocation of protection group members can be reduced but not eliminated by re-indexing drives. Groups of drives that exhibit recurrent patterns are swapped in step 716. Step 718 is relocating selected protection group members to preserve the predictable distribution of protection group members and spares. RAID members are relocated via the following three submatrix operations:

for (x=1; x<=R; x++)
  for (y=W−P+1; y<=W; y++)
    Disk[2*W+x].Cell[y]=Disk[x].Cell[y]

for (x=R+1; x<=W; x++)
  for (y=W−P+1; y<=W; y++)
    Disk[W+y].Cell[x]=Disk[x].Cell[y]
for (x=W+R+1; x<=2*W−P; x++)
  for (y=1; y<=R; y++)
    Disk[2*W+y].Cell[x−W]=Disk[x].Cell[y]

Advantages should not be viewed as limiting the concepts disclosed herein, but data and parity movement can be reduced relative to the N disks of movement when adding N disks to a cluster that can be expected from earlier techniques. Reducing data movement is advantageous because data movement temporarily engages system resources and delays availability of storage cells for active use. Moreover, the drawbacks associated with movement of data and parity are amplified by increases in drive storage capacity that result from the advance of disk drive design. In one of the cases described herein, the data and parity movement associated with adding 7 disks to a RAID 5 (8+1) cluster is reduced by half. For instance, with 30.72 TB disks, the data movement may be reduced from around 210 TB to 105 TB. In another one of the cases described herein, all relocation of data and parity can be avoided by rearranging the disk order/re-indexing. For instance, with 30.72 TB disks, the data movement of around 270 TB can be reduced to 0. The reduction of workloads associated with relocations of protection group members can result in improved storage system performance over an extended period of time.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims. For example, and without limitation, the concepts disclosed herein may be applied to Erasure Coding with D data members and P parity members, where the group size W=D+P.

What is claimed is:

1. A method, comprising:
    creating a drive cluster by:
      creating, for a protection group width W, where W is an integer greater than 1, a drive cluster of W+1 sequentially indexed drives;
      creating W same-size sequentially indexed cells in each of the sequentially indexed drives;
      creating, in a first cell index, a protection group in sequentially indexed drives starting with a lowest indexed drive; and
      creating W spare cells and (W−1) additional protection groups distributed in cell-index-wise consecutive runs of a spare cell followed by sequentially ordered members of the additional protection groups;
    receiving N new drives, where N is an integer greater than 0;
    determining that adding the N new drives to the drive cluster using a rotation-relocation algorithm to relocate W members in W lowest indexed drives of a lowest unrotated cell index, other than the first cell index, to the new drives will create a recurrent member distribution pattern on a first subset of the drives of the drive cluster and a second subset of the new drives; and
    swapping drive indices of the drives of the first subset with the drives of the second subset.

2. The method of claim 1 further comprising determining that N>W and, in response, creating one or more new clusters of W+1 of the new drives and proceeding to identify the recurrent member distribution pattern with N set to the number of remaining new drives.

3. The method of claim 1 further comprising adding the new drives without relocating members for a condition N=W and K=W+1, where K is the number of drives in the drive cluster to which N new drives are being added.

4. The method of claim 1 further comprising relocating selected members for a condition N≤W and K+N>2 W+1, where K is the number of drives in the drive cluster to which N new drives are being added.

5. The method of claim 4 further comprising relocating the selected members with three submatrix operations as follows where R=K+N−2 W−1 and P=2 W−K:
    for (x=1; x<=R; x++)
      for (y=W−P+1; y<=W; y++)
        Disk[2*W+x].Cell[y]=Disk[x].Cell[y]
    for (x=R+1; x<=W; x++)
      for (y=W−P+1; y<=W; y++)
        Disk[W+y].Cell[x]=Disk[x].Cell[y]
    for (x=W+R+1; x<=2*W−P; x++)
      for (y=1; y<=R; y++)
        Disk[2*W+y].Cell[x−W]=Disk[x].Cell[y].

6. The method of claim 1 further comprising determining that adding the N new drives to the drive cluster using the rotation-relocation algorithm will create the recurrent member distribution pattern by determining that a condition N≤W and K+N≤2 W+1 does not hold true.

7. The method of claim 6 further comprising adding the N new drives to the drive cluster using the rotation-relocation algorithm in response to determining that N≤W and K+N≤2 W+1.

8. An apparatus, comprising:
    a plurality of non-volatile drives;
    a plurality of interconnected compute nodes that manage access to the drives; and
    a Redundant Array of Independent Drives (RAID) controller configured to:
      create, for a protection group width W, where W is an integer greater than 1, a drive cluster of W+1 sequentially indexed drives;
      create at least W same-size sequentially indexed cells in each of the sequentially indexed drives;
      create, in a first cell index, a protection group in sequentially indexed drives starting with a lowest indexed drive;
      create W spare cells and (W−1) additional protection groups distributed in cell-index-wise consecutive runs of a spare cell followed by sequentially ordered members of the additional protection groups;
      responsive to receipt of N new drives, where N is an integer greater than 0, determine that adding the N new drives to the drive cluster using a rotation-relocation algorithm to relocate W members in W lowest indexed drives of a lowest unrotated cell index, other than the first cell index, to the new drives will create a recurrent member distribution pattern on a first subset of the drives of the drive cluster and a second subset of the new drives; and
      swap drive indices of the drives of the first subset with the drives of the second subset.

9. The apparatus of claim 8 further comprising the RAID controller configured to determine that N>W and, in response, create one or more new clusters of W+1 of the new drives and proceed to identify the recurrent member distribution pattern with N set to the number of remaining new drives.

10. The apparatus of claim 8 further comprising the RAID controller configured to add the new drives without relocating members for a condition N=W and K=W+1, where K is the number of drives in the drive cluster to which N new drives are being added.

11. The apparatus of claim 8 further comprising the RAID controller configured to relocate selected members for a condition N≤W and K+N>2 W+1, where K is the number of drives in the drive cluster to which N new drives are being added.

12. The apparatus of claim 8 further comprising the RAID controller configured to relocate the selected members with three submatrix operations as follows where R=K+N−2 W−1 and P=2 W−K:
for (x=1; x<=R; x++)
for (y=W−P+1; y<=W; y++)
  Disk[2*W+x].Cell[y]=Disk[x].Cell[y]
for (x=R+1; x<=W; x++)
for (y=W−P+1; y<=W; y++)
  Disk[W+y].Cell[x]=Disk[x].Cell[y]
for (x=W+R+1; x<=2*W−P; x++)
for (y=1; y<=R; y++)
  Disk[2*W+y].Cell[x−W]=Disk[x].Cell[y].

13. The apparatus of claim 8 further comprising the RAID controller configured to determine that adding the N new drives to the drive cluster using the rotation-relocation algorithm will create the recurrent member distribution pattern by determining that a condition N≤W and K+N≤2 W+1 does not hold true.

14. The apparatus of claim 8 further comprising the RAID controller configured to add the N new drives to the drive cluster using the rotation-relocation algorithm in response to determining that N≤W and K+N≤2 W+1.

15. A non-transitory computer-readable storage medium storing instructions that when executed by a computer cause the computer to perform a method for using a computer system to create and distribute spare capacity on a scalable drive subset on which protection groups are maintained, the method comprising:
 creating, for a protection group width W, where W is an integer greater than 1, a drive cluster of W+1 sequentially indexed drives;
 creating at least W same-size sequentially indexed cells in each of the sequentially indexed drives;
 creating, in a first cell index, a protection group in sequentially indexed drives starting with a lowest indexed drive;
 creating W spare cells and (W−1) additional protection groups distributed in cell-index-wise consecutive runs of a spare cell followed by sequentially ordered members of the additional protection groups;
 receiving N new drives, where N is an integer greater than 0;
 determining that adding the N new drives to the drive cluster using a rotation-relocation algorithm to relocate W members in W lowest indexed drives of a lowest unrotated cell index, other than the first cell index, to the new drives will create a recurrent member distribution pattern on a first subset of the drives of the drive cluster and a second subset of the new drives; and
 swapping drive indices of the drives of the first subset with the drives of the second subset.

16. The non-transitory computer-readable storage medium of claim 15 in which the method further comprises determining that N>W and, in response, creating one or more new clusters of W+1 of the new drives and proceeding to identify the recurrent member distribution pattern with N set to the number of remaining new drives.

17. The non-transitory computer-readable storage medium of claim 15 in which the method further comprises adding the new drives without relocating members for a condition N=W and K=W+1, where K is the number of drives in the drive cluster to which N new drives are being added.

18. The non-transitory computer-readable storage medium of claim 15 in which the method further comprises relocating selected members for a condition N≤W and K+N>2 W+1, where K is the number of drives in the drive cluster to which N new drives are being added.

19. The non-transitory computer-readable storage medium of claim 15 in which the method further comprises relocating the selected members with three submatrix operations as follows where R=K+N−2 W−1 and P=2 W−K:
for (x=1; x<=R; x++)
for (y=W−P+1; y<=W; y++)
  Disk[2*W+x].Cell[y]=Disk[x].Cell[y]
for (x=R+1; x<=W; x++)
for (y=W−P+1; y<=W; y++)
  Disk[W+y].Cell[x]=Disk[x].Cell[y]
for (x−W+R+1; x<=2*W−P; x++)
for (y=1; y<=R; y++)
  Disk[2*W+y].Cell[x−W]=Disk[x].Cell[y].

20. The non-transitory computer-readable storage medium of claim 15 in which the method further comprises determining that adding the N new drives to the drive cluster using the rotation-relocation algorithm will create the recurrent member distribution pattern by determining that a condition N≤W and K+N≤2 W+1 does not hold true, and adding the N new drives to the drive cluster using the rotation-relocation algorithm in response to determining that N≤W and K+N≤2 W+1.

* * * * *